US010328834B2

(12) United States Patent
Kelat

(10) Patent No.: US 10,328,834 B2
(45) Date of Patent: Jun. 25, 2019

(54) RETENTION CLIPS FOR VEHICLE CONSOLE ASSEMBLY

(71) Applicant: Calsonic Kansei North America, Inc., Farmington Hills, MI (US)

(72) Inventor: Vijeesh Kelat, Farmington Hills, MI (US)

(73) Assignee: CALSONIC KANSEI NORTH AMERICA, INC., Farmington Hills, MI (US)

(*) Notice: Subject to any disclaimer, the term of this patent is extended or adjusted under 35 U.S.C. 154(b) by 87 days.

(21) Appl. No.: 15/591,793

(22) Filed: May 10, 2017

(65) Prior Publication Data
US 2018/0186268 A1 Jul. 5, 2018

Related U.S. Application Data

(60) Provisional application No. 62/441,025, filed on Dec. 30, 2016.

(51) Int. Cl.
*B60N 3/10* (2006.01)
*B60R 7/04* (2006.01)

(52) U.S. Cl.
CPC ............... *B60N 3/103* (2013.01); *B60R 7/04* (2013.01)

(58) Field of Classification Search
CPC ... B60R 7/04; B60R 2011/0007; B60R 11/00; B60R 13/0262; B60R 13/0206; B60R 11/0241; B60R 11/0252
USPC .... 296/24.34, 37.8, 70, 1.08, 1.09, 24.3, 64, 296/190.01, 37.14; 29/428, 401.1, 430, 29/464, 825, 898.03
See application file for complete search history.

(56) References Cited

U.S. PATENT DOCUMENTS

| | | | | |
|---|---|---|---|---|
| 6,957,839 B1* | 10/2005 | Tiesler | ...................... | B60R 7/04 224/311 |
| 7,222,906 B2* | 5/2007 | Sakakibara | ............... | B60R 7/04 296/24.34 |
| 7,802,831 B2* | 9/2010 | Isayama | ............... | B60R 13/0262 296/24.34 |
| 8,615,962 B1* | 12/2013 | Perez | .................. | B60R 13/0206 24/292 |
| 2009/0110507 A1* | 4/2009 | Katoh | ................. | B60R 13/0206 411/80.1 |
| 2009/0320251 A1* | 12/2009 | Katoh | ..................... | F16B 5/065 24/457 |
| 2015/0375689 A1* | 12/2015 | Nagata | .................... | B60R 11/00 296/24.34 |

(Continued)

*Primary Examiner* — D Glenn Dayoan
*Assistant Examiner* — Sunsurraye Westbrook
(74) *Attorney, Agent, or Firm* — Foley & Lardner LLP

(57) ABSTRACT

A vehicle console assembly includes a console and a clip. A wall of the console defines an aperture extending between the front side and the back side of the wall. The clip is installable within the aperture of the console. The console and clip are configured to removably secure a cup holder within the console. The clip includes a head portion and two extensions insertable into the aperture. Each of the two extensions includes a leg extending from the head portion and a locking portion configured to engage with the console. The clip extends from a first end at an end of the head portion to a second end at an end of the extensions. The distance between opposite sides of the clip at the second end of the clip is less than the distance of an opening of the aperture along the front side of the wall.

20 Claims, 11 Drawing Sheets

(56) References Cited

U.S. PATENT DOCUMENTS

2016/0101692 A1* 4/2016 Chen .................. B60K 20/02
296/24.34

* cited by examiner

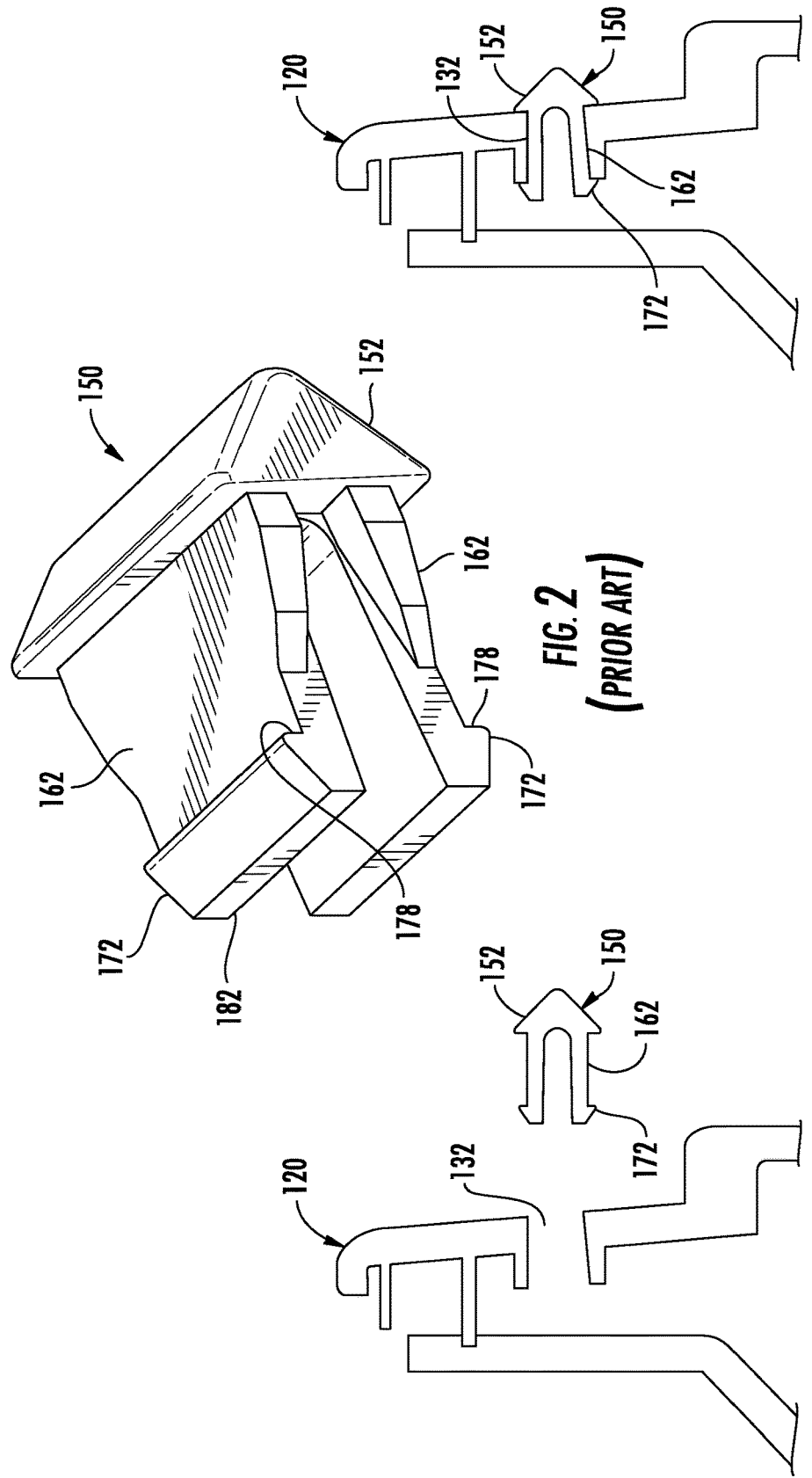

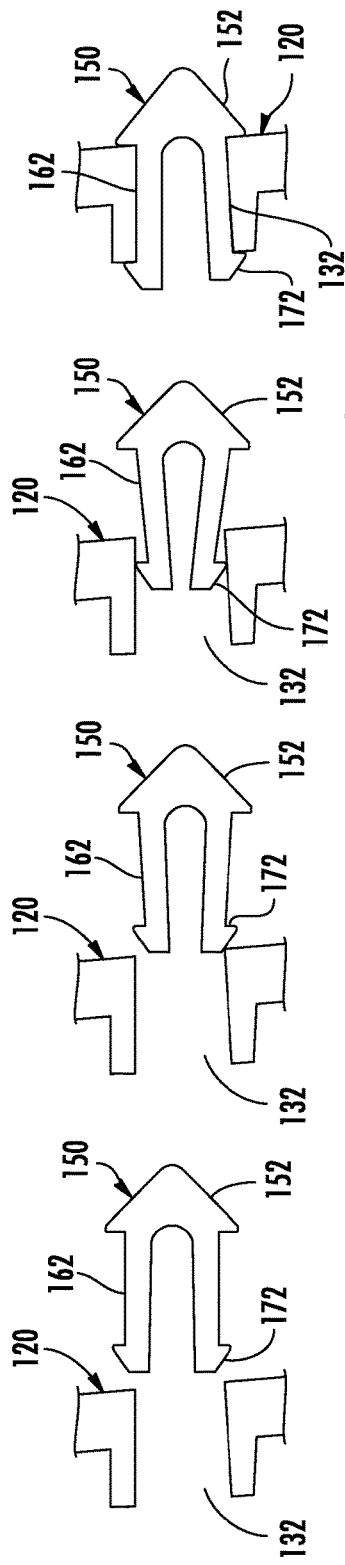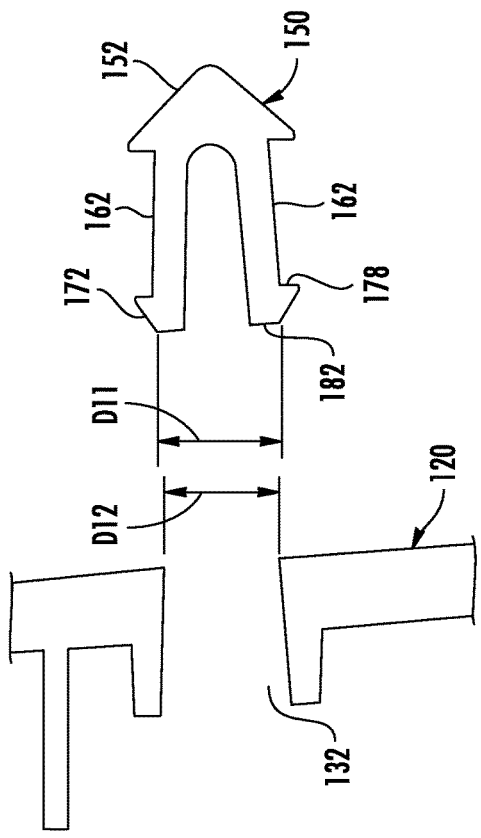

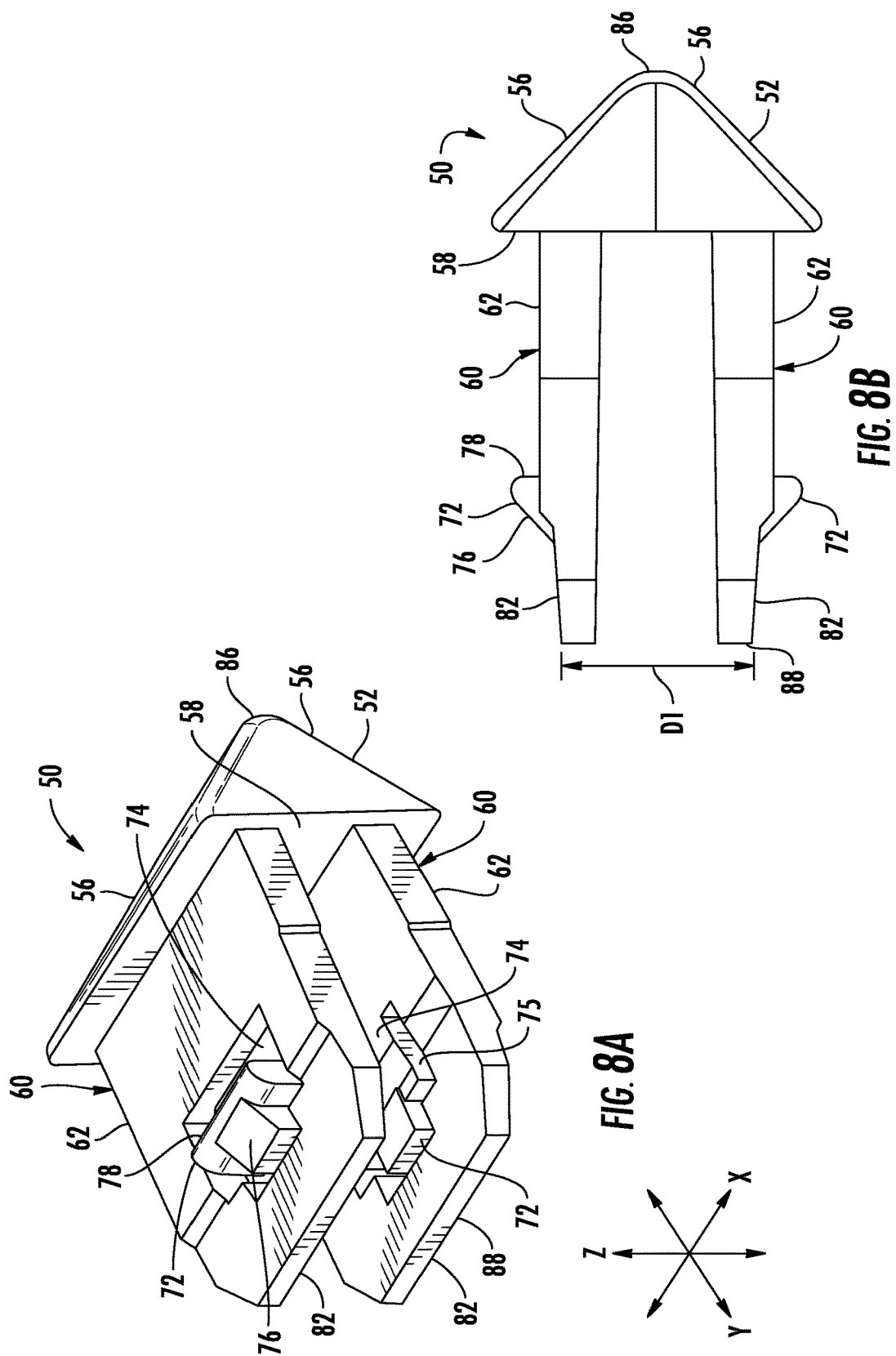

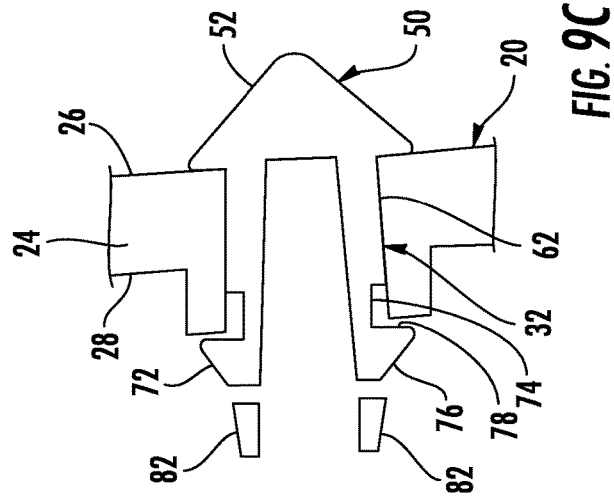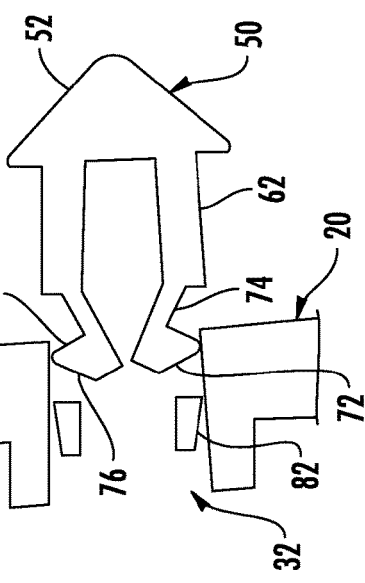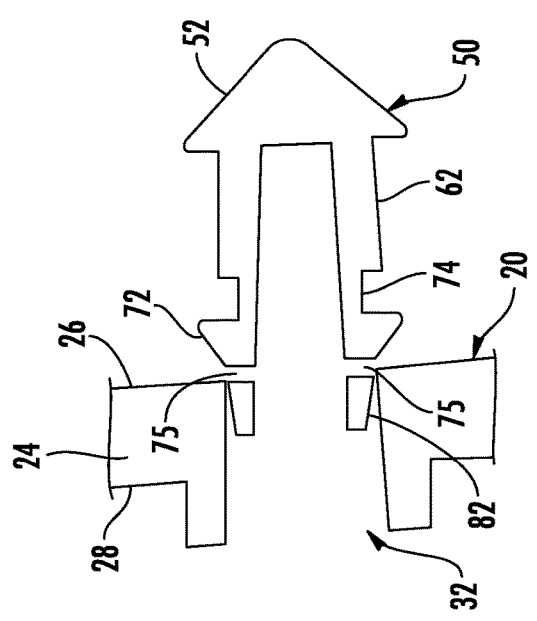

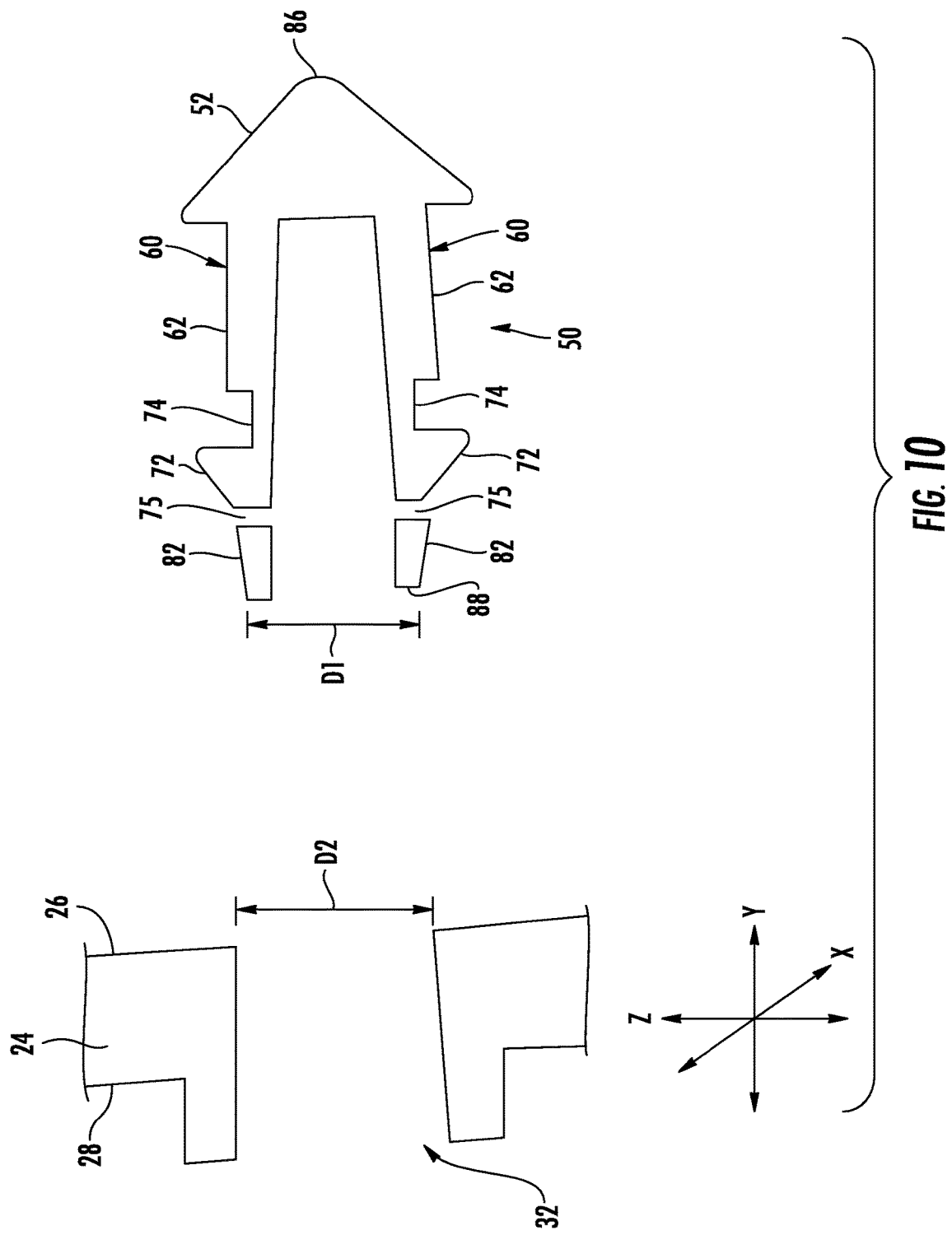

RETENTION CLIPS FOR VEHICLE CONSOLE ASSEMBLY

CROSS-REFERENCE TO RELATED PATENT APPLICATIONS

This application claims priority to and the benefit of U.S. Provisional Patent Application No. 62/441,025, filed on Dec. 30, 2016, the entire disclosure of which is incorporate herein by reference.

BACKGROUND

The present application relates generally to vehicle console assemblies that include a console and clips (e.g., "strikers") for retaining cup holders in a desired position. More specifically, the present application relates to an improved clip configuration for such vehicle consoles that provide for a more ergonomic and simple assembly process.

In a vehicle (e.g., a car, truck, etc.), a console may be provided between the front driver and passenger seats (or at other locations within the vehicle) that includes storage spaces, cup holders, electronic controls, and the like. In some applications, the console may include an adjustable cup holder that may be positioned at various locations within the cupholder using a fastener arrangement. In one particular configuration, the console may include a number of clips or "strikers" that can be positioned within apertures of a console to secure a cup holder in different locations along the length of the console. However, due to the configuration of the clips and the console, it may be relatively difficult to insert the clip into the apertures of the console.

For example, one conventional clip or striker 150 (e.g., a retention clip) is shown in FIG. 2. The conventional clip 150 includes two sides or legs 162 that extend between a head 152 at one end and ramped surface 172 at the opposite end. As shown in FIG. 2, the ramped surface 172 extends along the entire width of the ends of the legs 162 of the conventional clip 150. As shown in FIGS. 3A-3B, the conventional clip 150 is configured to be inserted into an aperture 132 in a console 120. The conventional clip 150 includes a lip 178 positioned on the back of the ramped surface 172 to lock with the console 120.

As illustrated best in FIG. 5, the distance D11 of the conventional clip 150 refers to the total distance between the top and bottom of the conventional clip 150 (i.e., the distance between opposite sides of the two legs, which includes the distance between the two legs 162 and the thickness of each of the legs 162). The distance D12 of the aperture 132 refers to the distance between the top and the bottom of an opening of the aperture 132. To ensure that the conventional clip 150 has a secure fit within the aperture 132, the distance D11 at the end 182 of the conventional clip 150 is larger than the distance D12 at the opening of the aperture 132, as shown in FIGS. 4A and 5. The end 182 of the conventional clip 150 refers to the end of the conventional clip 150 that is opposite the head 152. For example, the distance D11 at the end 182 of the conventional clip 150 is 5.1225 millimeters (mm) and the distance D12 at the opening of the aperture 132 is 4.6413 mm.

In order to insert the conventional clip 150 within the aperture 132 (as shown in FIGS. 4A-4D), the aperture 132 must first be located, as shown in FIG. 4A. Due to the difference in size between the distance D11 at the end 182 of the conventional clip 150 and the distance D12 at the opening of the aperture 132, the legs 162 of the conventional clip 150 must be pinched or compressed toward each other with a relatively large force in order to sufficiently decrease the distance D11 at the end 182 of the conventional clip 150 so that the conventional clip 150 can be inserted into and fit within the aperture 132, as shown in FIG. 4B. While being pinched, the conventional clip 150 is pushed into the aperture 132 (as shown in FIG. 4C) and the legs 162 are further compressed toward each other since the ramped surface 172 extends above the end 182 of the conventional clip 150. Once the ramped surface 172 and the lip 178 are moved completely through the aperture 132, the legs 162 snap back or expand outward, which allows the lip 178 to retain the conventional clip 150 within the aperture 132. FIG. 4D shows the conventional clip 150 completely inserted and retained within the aperture 132.

The conventional clips 150 may require a relatively large compressive force (e.g., approximately 9.5 Newtons (N)) to compress the legs 162 together for installation into the aperture 132 during installation. Because each console requires a number of clips to be inserted during the manufacturing process (e.g., eight clips per console, although that number may vary according to various embodiments), and because each clip is typically inserted by hand, it would be advantageous to provide an improved clip that requires less effort to insert within the apertures.

SUMMARY

One embodiment of the present disclosure relates to a clip configured for insertion into an opening in a vehicle console. The clip includes a head portion configured to project outward from the opening, two legs connected to the head portion and configured for insertion into the opening, two locking portions formed on a portion of each of the legs and extending along a portion of the width of each of the legs, the two locking portions configured to engage with the opening, and a connecting portion formed around a portion of each of the locking portions. A tip of each of the legs is configured to extend into the opening and guide the locking portion to the opening.

Another embodiment of the present disclosure relates to a vehicle console assembly that includes a console and a clip. The console includes a wall with a front side and a back side. The wall defines an aperture extending between the front side and the back side. The clip is installable within the aperture of the console. The console and clip are configured to removably secure a cup holder within the console. The clip includes a head portion configured to project outward from the aperture once the clip is installed within the aperture and two extensions configured for insertion into the aperture. Each of the two extensions includes a leg extending from the head portion and a locking portion configured to engage with the back side of the wall of the console when the clip is installed within the aperture. The clip extends from a first end at an end of the head portion to a second end at an end of the extensions. The distance between opposite sides of the clip at the second end of the clip is less than the distance of an opening of the aperture along the front side of the wall.

Another embodiment of the present disclosure relates to a clip configured for installation within an aperture defined by a wall of a vehicle console. The clip includes a head portion configured to project outward from the aperture once the clip is installed within the aperture and two extensions configured for insertion into the aperture. Each of the two extensions includes a leg extending from the head portion, a connecting portion configured to move relative to the leg, and a locking portion configured to engage with the wall of the console when the clip is installed within the aperture. The connecting portion movably connects the locking portion to the leg.

BRIEF DESCRIPTION OF THE DRAWINGS

FIG. 2 is a perspective view of a conventional clip.

FIG. 3A is a cross-sectional view of the conventional clip of FIG. 2 near a console.

FIG. 3B is a cross-sectional view of the conventional clip of FIG. 2 installed in a console.

FIG. 4A is a cross-sectional view of the conventional clip of FIG. 2 near an aperture of a console.

FIG. 4B is a cross-sectional view of the conventional clip of FIG. 2 being compressed.

FIG. 4C is a cross-sectional view of the conventional clip of FIG. 2 being pushed into the aperture of a console.

FIG. 4D is a cross-sectional view of the conventional clip of FIG. 2 installed in an aperture of a console.

FIG. 5 is a cross-sectional view of the conventional clip of FIG. 2 near an aperture of a console.

FIG. 8A is a perspective view of a clip that can be disposed within an aperture of the console assembly such as the aperture shown in FIG. 7B.

FIG. 8B is a side view of the clip of FIG. 8A.

FIG. 9A is a cross-sectional view of the clip of FIG. 8A being initially inserted into the aperture of FIG. 7B.

FIG. 9B is a cross-sectional view of the clip of FIG. 8A being pushed into the aperture of FIG. 7B.

FIG. 9C is a cross-sectional view of the clip of FIG. 8A installed within the aperture of FIG. 7B.

FIG. 10 is a cross-sectional view of the clip of FIG. 8A next to the aperture of FIG. 7B.

DETAILED DESCRIPTION

Referring to the figures generally, the various embodiments disclosed herein relate to a console assembly that includes a console and a clip or striker for allowing for the removable positioning of a cup holder at various locations within the console. The console assembly can be positioned within a vehicle and may hold or secure a cup holder in place within the vehicle. Due to the configuration and structure of the console and the clip, the clip is inserted or installed into an aperture of the console more easily and quickly (compared to conventional clips). Furthermore, the configuration of the clip allows the clip to be small, yet highly durable, as well as more ergonomic during assembly (which is particularly beneficial during assembly of large volumes of clips and consoles).

Once the clip is installed, the clip is securely held within the aperture. The console assembly with the clip reduces the noise (e.g., the "buzz, squeak, rattle") within the vehicle while still providing movable features (e.g., the movable cup holder). Additionally, by creating a more secure clip and connection between the clip and the console, the cup holder is more effectively supported.

The console assembly described herein may be used in a variety of applications and moveable devices, such as vehicles. The console assembly is also useful in any non-vehicle application wherein it would be desirable to secure a movable or adjustable cup holder.

According to one embodiment, the console assembly can be positioned within a vehicle that includes an interior passenger compartment that provides seating to an occupant. The console assembly can be used within any type of vehicle, such as a two door or four door automobile, a truck, a SUV, a van, a train, a boat, an airplane, or other suitable vehicular conveyance. Multiple console assemblies could be disposed at various locations within the vehicle in order to secure other cup holders. For example, a console assembly may be positioned in the front seat of a vehicle between a driver seat and a passenger seat. According to other exemplary embodiments, the console assembly may be provided in a rear seat area of a vehicle (e.g., between adjacent seats).

Console Assembly

Figure 1:
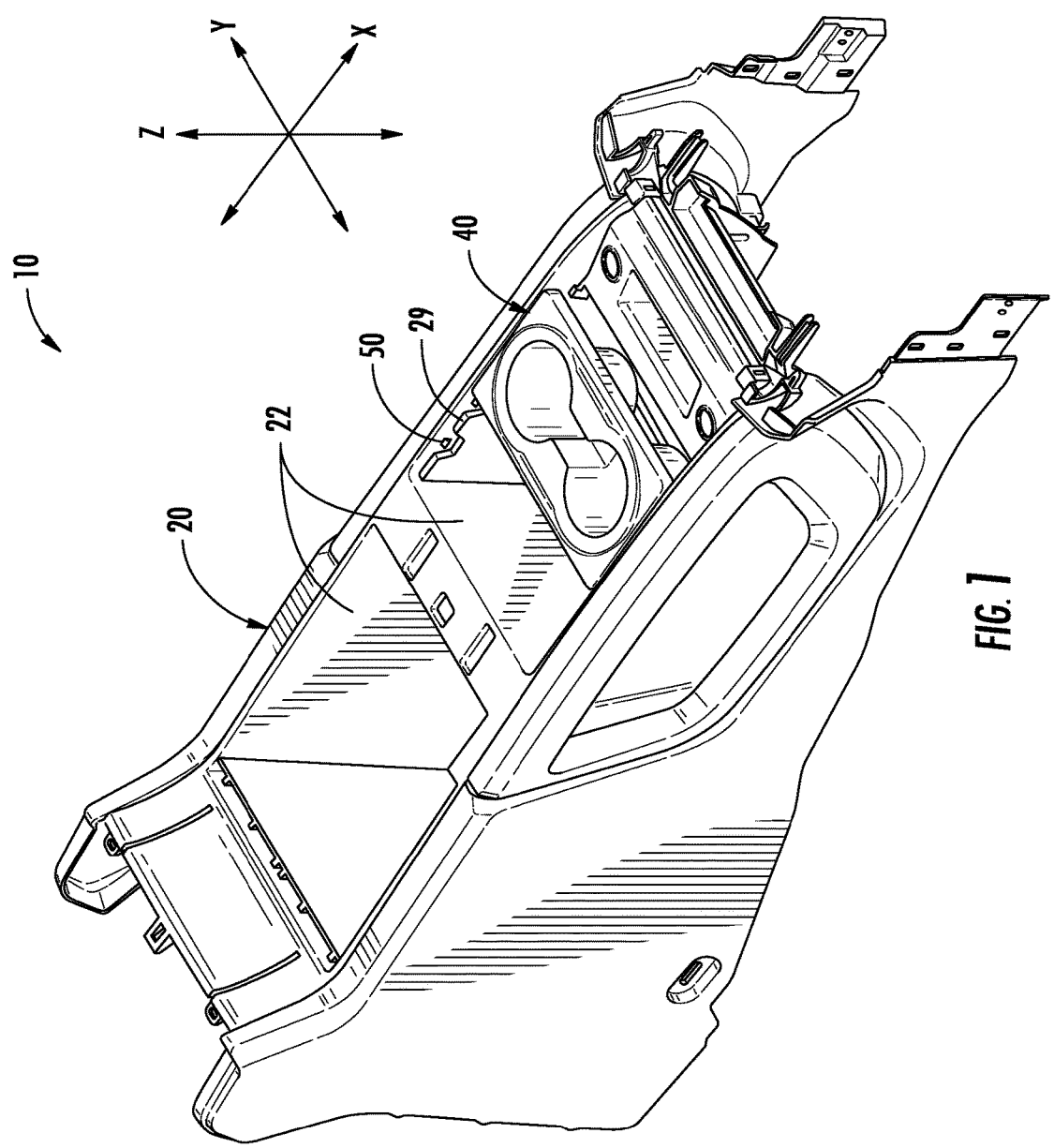
FIG. 1 is a perspective view of a console assembly according to an exemplary embodiment.
Figure 6A:
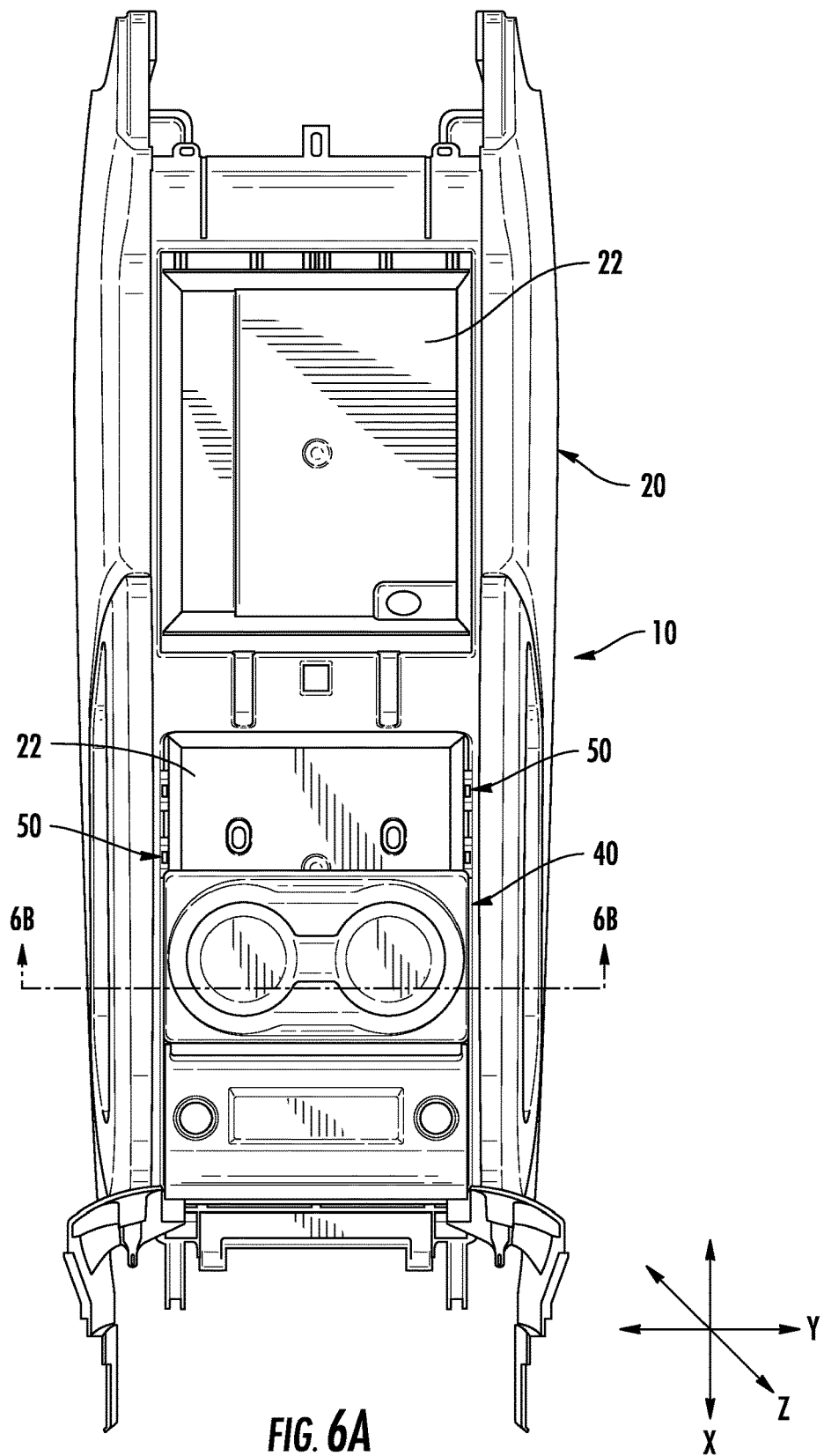
FIG. 6A is a top view of the console assembly of FIG. 1.

As shown in FIGS. 1 and 6A, a console assembly 10 can comprise a console 20, a clip 50, and a cup holder 40. As described further herein, the console 20 and the clip 50 are used together in order to removably secure a cup holder insert or a cup holder 40 within the console 20 of the console assembly 10.

The console assembly 10 can be, for example, a center console assembly or a body console assembly positioned within a vehicle between two seats. The console assembly 10 could also be positioned in other areas within the vehicle in order to provide storage areas 22 and cup holder(s) 40 for occupants within the vehicle.

The cup holder 40 is movable and securable along the length of the console 20 and can include areas to secure at least one container (e.g., a cup, can, or bottle). Although a cup holder 40 is shown, it is understood that a variety of different movable storage units can be movable and securable along the length of the console 20, and may similarly utilize the clips as disclosed in the present application to allow for their repositioning.

The occupant can easily remove the cup holder 40 from the console 20 and reposition or move the cup holder 40 in a variety of different positions or locations along the length of the console 20 according to their preference or comfort or in order to access certain portions of the storage areas 22. The occupant can remove the cup holder 40 from the console 20 easily, without tools, and without breaking the cup holder 40 such that a range of different individuals can use the console assembly 10.

By inserting the clips 50 into apertures 32 within the console 20, certain discrete areas that the cup holder 40 to be moved to are created or provided. The cup holder 40 can be removably secured to the clips 50 within the console 20 to allow the occupant to change the position of the cup holder 40 within the console.

Furthermore, the console assembly 10 securely holds the cup holder 40 and allows the cup holder 40 to be removed and reattached, repositioned, or replaced many times (such as approximately 1500 cycles).

Console

Figure 6B:
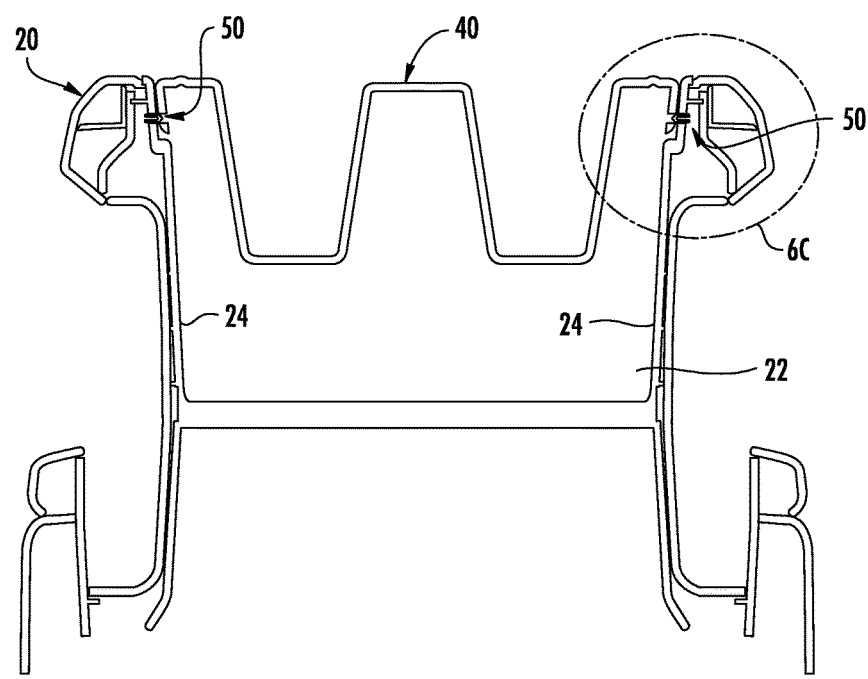
FIG. 6B is a cross-sectional view through Section 6B-6B of FIG. 6A.

As shown in FIGS. 1 and 6B, the console 20 may provide one or more storage areas 22. The storage areas 22 may optionally be at least partially covered by a lid or by the cup holder 40. For reference, the width of the console 20 (and its components) is in a direction parallel to the y-axis, the length of the console 20 (and its components) is in a direction parallel to the x-axis, and the height of the console 20 (and its components) is in a direction parallel to the z-axis.

Figure 6C:
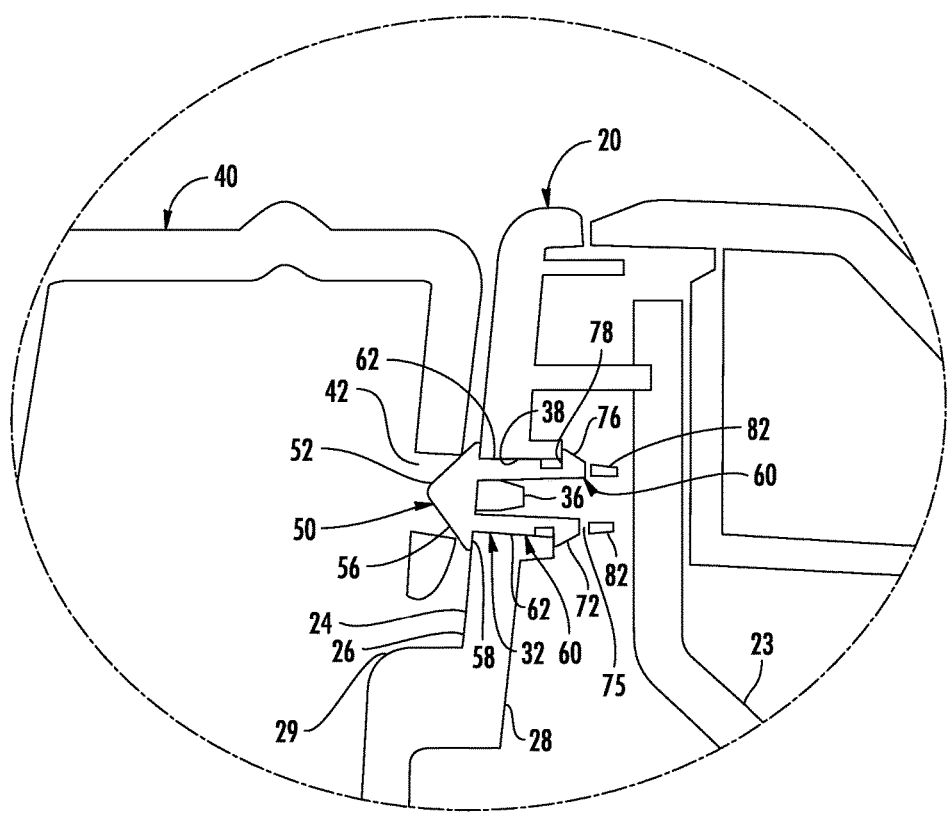
FIG. 6C is an enlarged view of Section 6C of FIG. 6B.

The console 20 may also have at least one inner side or wall 24 that may optionally be a part of or define the storage areas 22. The console may include multiple walls 24. The walls 24 have a front side 26 that faces into the storage area 22 and a back side 28 that faces away from the storage area 22. The movable cup holder 40 fits between two parallel walls 24 of one of the storage areas 22 of the console 20 (along the width of the console 20). As shown in FIG. 6C, the console 20 may include a side panel 23.

Figure 7A:
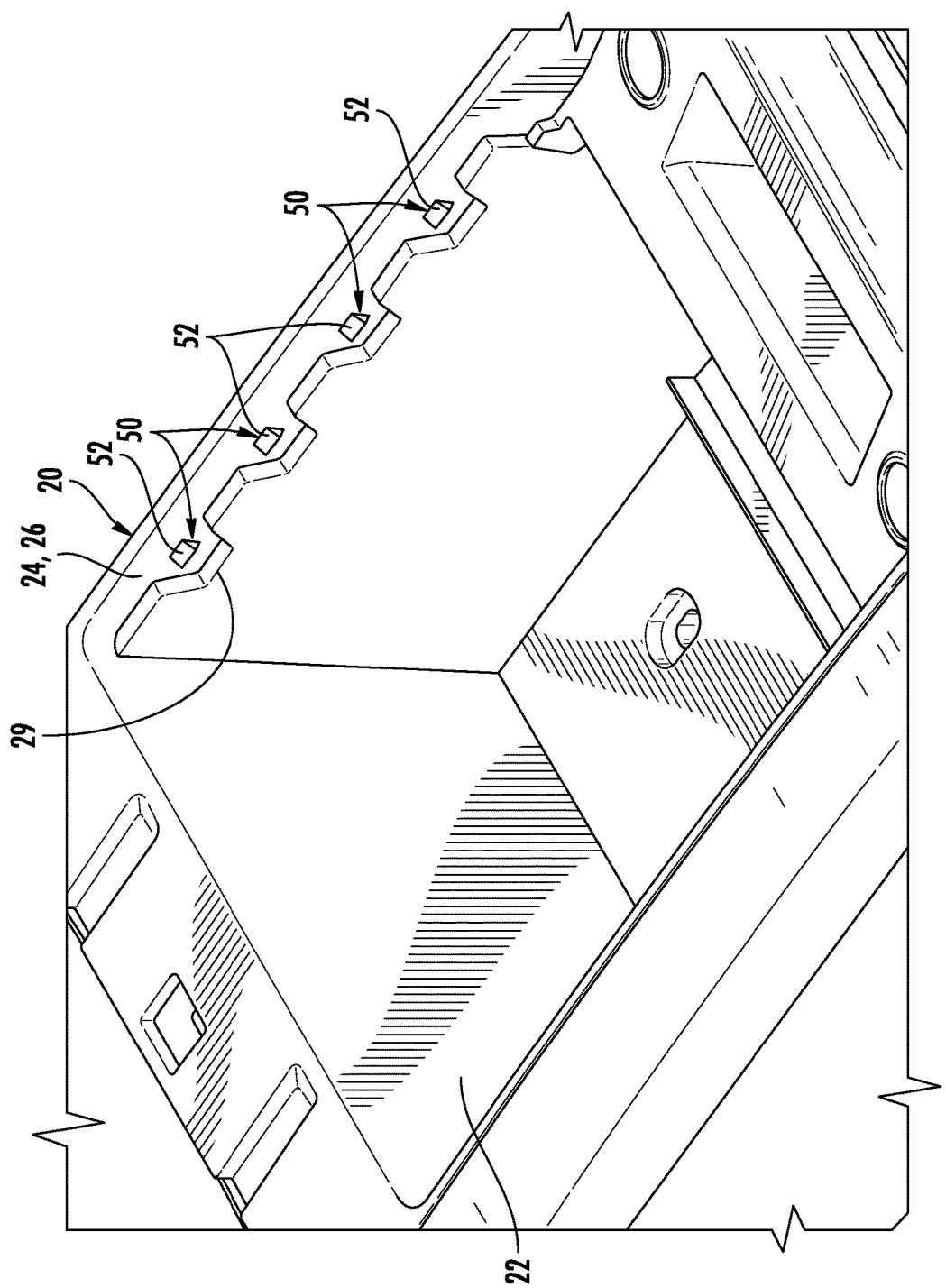
FIG. 7A is an enlarged perspective view of a portion of the console assembly of FIG. 1.
Figure 7B:
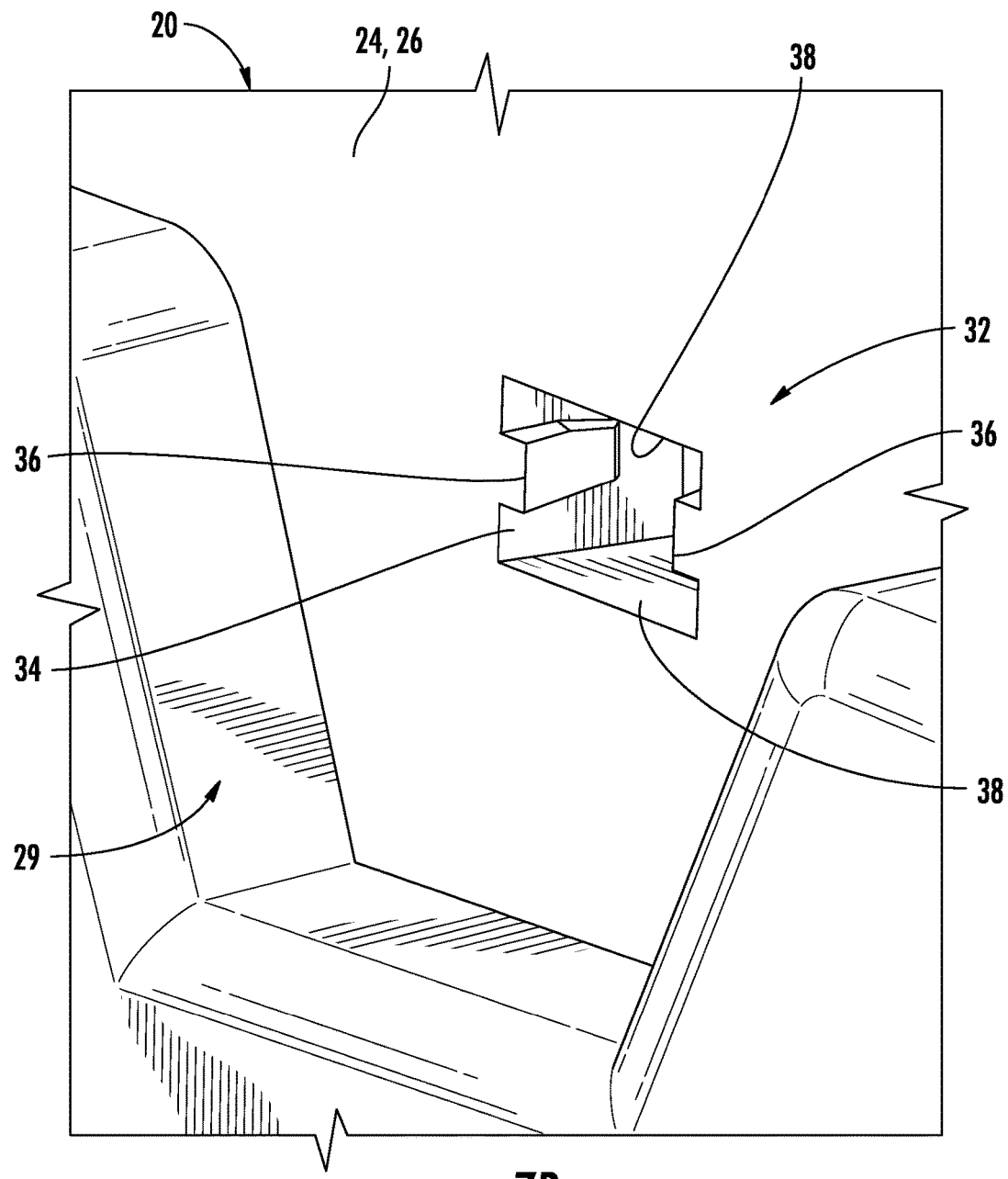
FIG. 7B is a perspective view illustrating an aperture provided in the console assembly of FIG. 7A without the clip.

To position the cup holder 40 in particular areas along the length of the console 20, the walls 24 may include ledges 29 that a portion of the cup holder 40 can fit within or be guided by, as shown in FIGS. 1 and 7A-7B. The ledges 29 extend toward the center of the storage area 22 to provide an area for the cup holder 40 to rest on. The ledges 29 can include a lower portion and side portions in order to further secure and position the cup holder 40 within the console 20.

As shown in FIGS. 7A-7B, the walls 24 of the console 20 define a divot, hole, slot, opening, or aperture 32 extending between the front side 26 and the back side 28 of the wall 24. The walls 24 may define multiple apertures 32 and the apertures 32 may be positioned along the length of the walls 24 of the console 20 and in or near divots within the ledge 29.

The apertures 32 provide an area for the clips 50 to attach to the console 20. As described further herein, at least a portion of a clip 50 can be inserted into and secured within each of the apertures 32 (as shown in FIG. 7A) to allow the cup holder 40 to be moved and secured along the length of the console 20. Accordingly, multiple clips 50 can be positioned along the length of the console 20 in order to allow the cup holder 40 to be secured at various discrete points along the length of the console 20.

As shown in FIGS. 6C and 7B, each aperture 32 includes at least one shoulder, extension, locking feature, or projection 36 that prevents the clip 50 from coming out of the aperture 32 after installation, in particular while the cup holder 40 is being removed from the clips 50 and the console 20. The projection 36 is positioned along the center or middle of an inner side 34 and extends from the inner side 34 of the aperture 32 toward the center of the aperture 32. However, the projections 36 only extend partially into the center of the aperture 32 (instead of the way into the center of the aperture 32) to avoid interference with the locking portion 72 of the clip 50 (as described further herein). The projection 36 also extends along at least a portion of the width of the inner sides 34 of the aperture 32.

According to one embodiment as shown in FIG. 7B, the aperture 32 has two projections 36, which are each positioned on opposite inner sides 34 of the aperture 32 (e.g., the left and right sides of the aperture 32). The adjacent sides 38 (e.g., the top and bottom sides of the aperture 32), however, do not have projections 36. According to other exemplary embodiments in which the clip 50 to be inserted into the aperture 32 has a different configuration, for example, in which the legs 62 of the clip 50 are oriented perpendicular to the direction shown in the accompanying figures, the projections 36 may instead extend from the top and bottom of the aperture 32.

Clip

As shown in FIGS. 6C, 7A, and 8A-9C, a clip 50 (which may be referred to as a retention clip, striker, fastener, or holding part) is used within the console 20 and is configured to be inserted into and installed within the aperture 32 in order to hold, secure, support, or retain the cup holder 40 in place along the length of the console 20. The clip 50 allows the cup holder 40 to be securely held within the console 20 and also to be removable from and repositionable within the console 20 to different areas along the length of the console 20. By securing the cup holder 40, the clip 50 prevents or reduces noise (e.g., any "buzz, squeak, rattle") and increases the durability of the console assembly 10, while still allowing the occupant to position and move the cup holder 40 in a variety of different areas within the console 20.

For reference, the width of the clip 50 (and its components) is in a direction parallel to the x-axis, the length of the clip 50 (and its components) is in a direction parallel to the y-axis, and the height of the clip 50 (and its components) is in a direction parallel to the z-axis. It is noted that the cross-sections of the clip 50 (see, e.g., FIGS. 6C and 9A-10) are taken through an axis extending through the gap 75 between the tips 82 and the locking portion 72. The tips 82 are attached to the rest of the clip 50 through the legs 62 in an area without the gap 75, as shown in FIG. 8A.

The clip 50 includes a projecting portion or head portion 52 and two extensions 60. Each of the extensions 60 are inserted into or through the aperture 32 during installation of the clip 50 into the aperture 32, while the head portion 52 remains outside of the aperture 32. As shown in FIGS. 8B and 10, the clip 50 extends from a first end 86 at an end of the head portion 52 to a second end 88 at an end of the extensions 60 (e.g., at the end of the tips 82).

In order to support and secure the cup holder 40, the head or head portion 52 of the clip 50 is configured to extend out of, be exposed from, or projected outward from the aperture 32 into the storage area 22 of the console 20 once the clip 50 is installed within the apertures 32, as shown in FIG. 7A. The head portion 52 may optionally extend along at least a portion of the front side 26 of the wall 24.

The back side 58 of the head portion 52 (that directly abuts the front side 26 of the wall 24, as shown in FIG. 6C) is substantially flat and is directly connected to each of the extensions 60. The extensions 60 extend or project substantially perpendicularly from the back side 58 of the head portion 52. The back side 58 extends beyond the top, sides, and bottom of the extensions 60. The back side 58 is larger than the aperture 32 in order to prevent the clip 50 from moving completely through the aperture 32.

According to one embodiment as shown in FIGS. 8A-8B, the front sides 56 of the head portion 52 are angled relative to the back side 58 and form a substantially triangular cross-section of the head portion 52 that extends into the storage area 22. As shown in FIG. 6C, the cup holder 40 defines at least one hole, aperture, or opening 42 that the head portion 52 of the clip 50 can be inserted into in order to secure the cup holder 40 within the console 20. Accordingly, the front sides 56 of the clip 50 directly abut the opening 42 of the cup holder 40.

The two extensions 60 of the clip 50, which project substantially perpendicularly from the back side 58 of the head portion 52, are configured to be inserted into the aperture 32 during installation. Each of the extensions 60 includes a leg 62, a connecting portion 74, and a locking portion 72.

The two base plates, base portions, or legs 62 extend substantially perpendicularly from and connects to the back side 58 of the head portion 52. As shown in FIGS. 6C and 9C, the legs 62 of the clip 50 take the shape of the aperture 32 once the clip 50 is installed within the aperture 32 and maintain a tight fit as the legs 62 extend outward within the aperture 32. Furthermore, the width of the leg 62 is approximately equal to the length of the aperture 32 in order to prevent any looseness between the clip 50 and the aperture 32 when the clip 50 is installed.

Each of the extensions 60 includes a flexing region, connecting portion, or bendable connecting portion 74 that movably connects the locking portion 72 to the leg 62, as shown in FIGS. 8A and 9A-9C. Accordingly, the connecting portion 74 is formed on the locking portion 72 and the leg 62. The connecting portion 74 is configured to move relative to the leg 62 by bending or flexing during installation. Accordingly, the connecting portion 74 may be less thick than the leg 62 and the locking portion 72 and formed by a notch in the clip 50, which allows the connecting portion 74 to flex or bend more easily. As shown in FIGS. 9A-9C, the connecting portions 74 bend inward in order to allow the locking portions 72 to compress or move inward toward each other to the center of the clip 50 such that the locking portions 72 can fit within and move through the aperture 32 of the console 20 as the clip 50 is being installed into the aperture 32.

In order to secure and lock the clip 50 within the aperture 32, each of the extensions 60 include a snap, lip, catch, or locking portion 72 connected to a portion of the leg 62 through the connecting portion 74. The locking portion 72 includes a lip 78 and a ramped side 76.

As shown in FIGS. 6C and 9C, the back side or lip 78 of the locking portion 72 extends substantially perpendicularly to the leg 62 and directly contacts and extends around a portion of the back side 28 of the wall 24 when the clip 50 is installed within the aperture 32 in order to engage and lock the clip 50 to the aperture 32 and the back side 28 of the wall 24. The lip 38 prevents the clip 50 from being removed from or coming out of the aperture 32.

In order to easily insert, move, and guide the locking portion 72 into the aperture 32, the front side or ramped side 76 of the locking portion 72 is angled or chamfered relative to the lip 78 of the locking portion 72, as shown in FIGS. 6C, 8A-8B, and 9A-9C. Accordingly, as the clip 50 is moved into the aperture 32, the ramped side 76 of the locking portion 72 contacts a side of the aperture 32 (i.e., the adjacent side 38 of the aperture 32), which moves the locking portion 72 toward the center of the aperture 32 as the connecting portion 74 bends.

The connecting portion 74 is formed around a portion of the perimeter of the locking portion 72 in order to connect the locking portion 72 to the leg 62. As shown in FIG. 8A, an aperture or gap 75 extends around the rest of the perimeter of the locking portion 72 in order to allow the locking portion 72 move relative to the leg 62.

As shown in FIG. 8A, the locking portion 72 and the connecting portion 74 only extend along a portion of the entire width of the extension 60, rather than extending along the entire width of the extension 60. Accordingly, the locking portion 72 and the connecting portion 74 are less wide than the leg 62 and can be compressed and moved toward the center of the aperture 32 more easily and with less force during installation.

Furthermore, the locking portion 72 and the connecting portion 74 are positioned in a center or middle region of the extension 60 (e.g., in the middle of the leg 62). This configuration allows the locking portion 72 and the connecting portion 74 to move inwardly during installation without hitting or contacting the projections 36 of the aperture 32, as described further herein. For example, during installation, the locking portions 72 and the connecting portions 74 are moved and compressed between the two projections 36 on either inner side 34 of the aperture 32.

As shown in FIG. 8A, at least a portion of the leg 62 is positioned next to the locking portion 72 along the entire width of the extension 60. For example, the leg 62 may be positioned on both sides of the locking portion 72 and connecting portion 74.

In order to guide the clip 50 into the aperture 32 more easily, the end of the leg 62 includes a taper, chamfered edge, or tip 82 that extends beyond the locking portion 72 along the length of the clip 50. By extending outward beyond the locking portion 72, the tips 82 are lead-in's or locating ends that allows the user to locate the aperture 32 more easily and guide the clip 50 into the aperture 32.

Further, due to the relative size of the distance D1 at the second end 88 of the clip 50 (i.e., at the end of the tips 82) and the distance D2 of the aperture 32 (as described further herein), the user can insert the clip 50 into the aperture 32 more easily and with less force since the tips 82 do not need to be compressed while being inserted into the aperture 32. The distance D1 of the clip 50 refers to the total distance between the top and bottom of the clip 50 (i.e., the distance between opposite sides of the clip). Accordingly, the distance D1 refers to the distance between the two legs 62 or tips 82 and the thickness of each of the legs 62 or tips 82, which may be taken along an axis parallel to the z-axis.

The distance D1 at the second end 88 of the clip 50 (i.e., the distance between opposite sides of the tips 82 at the second end 88) may be smaller than the distance D1 along the rest of the tips 82 and the legs 62 (i.e., the distance D1 between opposites sides of the rest of the tips 82 and the legs 62). In order to have a smaller distance D1 at the second end 88 of the clip 50 than the leg 62, the tip 82 can be a step down from the rest of the leg 62 or can be angled down from the rest of the leg 62. Accordingly, the tip 82 may be at a different angle (relative to the head portion 52) than the rest of the leg 62, which may help guide the rest of the clip 50 (in particular the legs 62 and the locking portions 72) to and into the aperture 32.

Interaction Between the Clip and the Aperture

A clip 50 can be inserted into each of the apertures 32. Accordingly, since the apertures 32 extend along the length of the console, a plurality of or multiple clips 50 can be positioned along the length of the console 20 and on both sides of the console 20 within each of the apertures 32, as shown in FIGS. 6A-7A.

As shown in FIGS. 7A and 9A-9C, at least a portion of each of the clips 50 is inserted into and secured within each of the apertures 32 of the console 20. Due to the configuration of the clip 50, the clip 50 does not need to be externally pinched or compressed (e.g., by the person assembling the clip 50 into the aperture 32) to completely insert the clip 50 into the aperture 32, which makes assembling the clip 50 into the aperture 32 much easier compared to conventional clips 150. First, as the user guides the clip 50 toward the aperture 32, the tips 82 of the legs 62 of the clip 50 help initially guide the clip 50 into the aperture 32 (as shown in FIG. 9A) without any part of the clip 50 being compressed. Once the tips 82 of the clip 50 are positioned at least partially within the aperture 32, the clip 50 can be further pushed into the aperture 32 (as shown in FIG. 9B), which causes each of the ramped sides 76 of the locking portion 72 to abut and engage with each of the adjacent sides 38 of the aperture 32. As the clip 50 is moved further into the aperture 32, the adjacent sides 38 of the aperture 32 cause the ramped sides 76 (and thus the locking portions 72) to move toward each other to the center of the aperture 32. The connecting portions 74 bend toward each other, which allows the locking portions 72 compress toward the middle of the clip 50. The legs 62, however, do not significantly compress as the clip 50 is being installed. Once the clip 50 is installed (as shown in FIG. 9C), the lips 78 of the locking portions 72 extend around a portion of the back side 28 of the wall 24 in order to lock the clip 50 in place.

The relative dimensions of the clip 50 to the aperture 32 allow the user to more easily locate the aperture 32 with the clip 50 before any part of the clip 50 is compressed. Furthermore, the clip 50 can partially extend into the aperture 32 once the aperture 32 is located without compressing any part of the clip 50, which allows the clip 50 to be more easily inserted into the aperture 32. For example, the distance D1 at the second end 88 of the clip 50 (i.e., at the end of the tips 82) is less than the distance D2 of the opening of the aperture 32 (along the front side 26 of the wall 24). The distance D2 of the aperture 32 refers to the distance between the top and the bottom of the aperture 32. This configuration allows both of the tips 82 of the clip 50 to be inserted into the aperture 32 without compressing the clip 50. Since the tips 82 extend beyond the locking portions 72, the tips 82 (at the second end 88) are inserted into the aperture 32 first (as shown in FIG. 9A). Accordingly, as the user is locating the aperture 32, both of the tips 82 can be inserted into the aperture 32 without any part of the clip 50 being compressed, which guides the rest of the clip 50 (including the locking portion 72) to the aperture 32.

Additionally, since the distance D1 along the entire length of the legs 62 is approximately the same or less than the distance D2 along the entire length of the aperture 32, the legs 62 can be inserted straight into the aperture 32 without any significant compression of the legs 62, as shown in FIG. 10.

According to one embodiment, the distance D1 at the second end 88 of the clip 50 may be approximately 4.1541 mm and the distance D2 along the front side 26 of the wall 24 of the aperture 32 may be approximately 4.6413 mm.

Due to the configuration of the clip 50, the clip 50 requires a relatively smaller force to be inserted into the aperture 32 as compared to conventional clips 150. For example, the clip 50 may only require approximately 5.2 N to be inserted into the aperture according to an exemplary embodiment.

Additionally, the projections 36 of the aperture 32 are intended to prevent or restrict the legs 62 of the clip 50 from compressing inwardly away from the adjacent sides 38 and from moving toward each other or disengaging from the aperture 32. As shown in FIG. 6C, as the clip 50 is inserted into the aperture 32, each of the legs 62 of the clip 50 are inserted between the projections 36 (which extend from the inner sides 34) and adjacent sides 38 of the aperture 32. Accordingly, once the clip 50 is inserted into and installed within the aperture 32, the legs 62 of the clip 50 are positioned between the projections 36 and one of the adjacent sides 38 and the projections 36 of the aperture 32 are positioned between the legs 62 of the clip 50. Accordingly, the projections 36 force the legs 62 to remain spaced apart. Since the legs 62 cannot compress inwardly and the locking portions 72 extends around a portion of the back sides 28 of the wall 24 (as described further herein), the clip 50 is secured within the aperture 32 and is prevented from being ejected out of the aperture 32.

Since the locking portion 72 is positioned in the middle of the clip 50 and the projections 36 do not extend all the way to the center of the aperture 32, the projections 36 of the aperture 32 do not interfere with the movement of the locking portions 72 as the locking portions 72 move or compress into the center of the aperture 32 during installation. Since the locking portions 72 are the only portions of the clip 50 that extend along the back side 28 of the wall 24 of the storage area 22, the locking portions 72 are the only portions that need to be compressed inwardly during assembly, as shown in FIGS. 9A-9C.

Once the clip 50 is completely installed within the aperture 32, the user may move the cup holder 40 within the console 20 such that the cup holder 40 engages with and is secured by the clip 50 along the length of the console 20, as shown in FIG. 6C. Since the head portion 52 of the clip 50 projects into the console 20, the opening 42 of the cup holder 40 can be removably secured around the head portion 52 of the clip 50. Accordingly, the head portion 52 of the clip 50 extends at least partially within the opening 42 of the cup holder 40 and the opening 42 directly abuts at least one of the front sides 56 of the head portion 52.

The clip 50, the console 20, and the cup holder 40 can each be constructed out of a variety of different materials, depending on the desired configuration. In order to withstand a relatively larger force from the cup holder 40 being removed and reattached, the clip 50 may be contrasted out of a relatively stronger or harder material than the walls 24 of the console 20. For example, in order to remove the cup holder 40 from the console 20, approximately 120-130 N may be required, which may be distributed between multiple clips 50 (such as between four clips 50). According to one embodiment, the clip 50 may be constructed out of plastic or polyoxene methalyne (POEM), the console 20 may be constructed out of polypropylene composite (PPC), and the cup holder 40 may be constructed out of acrylonitrile butadiene styrene (ABS). According to one embodiment, the clip 50 can be injection molded.

It is understood that, although the clip 50 is shown with the console 20 and the cup holder 40, it is understood that the clip 50 can be used with a variety of different devices. The clip 50 can be particularly beneficial in areas with a small space constraint or a small aperture.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A clip configured for insertion into an opening in a vehicle console, the clip comprising:
    a head portion configured to project outward from the opening; and
    two extensions configured for insertion into the opening, wherein each of the two extensions comprises
        a leg connected to the head portion and configured for insertion into the opening,
        a locking portion formed on a portion of the leg and extending along a portion of the width of the leg, the locking portion configured to engage with the opening, wherein the locking portion only extends along a portion of the entire width of the extension, and
        a connecting portion formed around a portion of the locking portion, wherein the connecting portion is less thick than the leg and the locking portion,
    wherein a tip of the leg is configured to extend into the opening and guide the locking portion to the opening, wherein a gap is positioned between the tip and the locking portion along an insertion direction of the clip.

2. The clip according claim 1, wherein the connecting portion connects the locking portion to the leg and is configured to bend.

3. The clip according claim 1, wherein the tip of the leg is angled to guide the locking portion to the opening.

4. The clip according claim 1, wherein the striker is configured to hold a cup holder, wherein the cup holder is removable on a center console.

5. A vehicle console assembly comprising:
    a console that includes a wall with a front side and a back side, wherein the wall defines an aperture extending between the front side and the back side; and
    a clip installable within the aperture of the console, wherein the console and clip are configured to removably secure a cup holder within the console,
    wherein the clip comprises
        a head portion configured to project outward from the aperture and to be positioned along the front side of the wall once the clip is installed within the aperture, and
        two extensions configured for insertion into the aperture,
        wherein each of the two extensions comprises
            a leg extending from the head portion and configured to be positioned at least partially within the aperture when the clip is installed within the aperture, and
            a locking portion configured to engage with the back side of the wall of the console when the clip is installed within the aperture,
        wherein the clip extends from a first end at an end of the head portion to a second end at an end of the extensions, wherein the distance between opposite sides of the clip at the second end of the clip is less than the distance of an opening of the aperture along the front side of the wall, wherein the locking portion is positioned between the head portion and the second end.

6. The console assembly of claim 5, wherein each of the extensions comprises a connecting portion configured to move relative to the leg, wherein the connecting portion movably connects the locking portion to the leg.

7. The console assembly of claim 6, wherein the connecting portion is less thick than the leg and the locking portion.

8. The console assembly of claim 5, wherein the locking portion only extends along a portion of the entire width of the extension.

9. The console assembly of claim 5, wherein at least a portion of the leg is positioned next to the locking portion along the entire width of the extension.

10. The console assembly of claim 5, wherein the leg includes a tip extending beyond the locking portion along the length of the clip, wherein the distance between opposite sides of the tips of each of the extensions of the clip is less than the distance between opposite sides of the legs of each of the extensions of the clip.

11. The console assembly of claim 5, wherein the aperture includes at least one projection extending toward a center region of the aperture, wherein, when the clip is installed within the aperture, the at least one projection is positioned between the legs of each of the extensions.

12. The console assembly of claim 5, wherein the cup holder is repositionable along the length of the console.

13. A clip configured for installation within an aperture defined by a wall of a vehicle console, the clip comprising:
    a head portion configured to project outward from the aperture once the clip is installed within the aperture; and
    two extensions configured for insertion into the aperture, wherein each of the two extensions comprises
        a leg extending from the head portion,
        a connecting portion configured to move relative to the leg, and
        a locking portion configured to engage with the wall of the console when the clip is installed within the aperture,
    wherein the connecting portion movably connects the locking portion to the leg.

14. The console assembly of claim 13, wherein the clip extends from a first end at an end of the head portion to a second end at an end of the extensions, wherein the locking portion is configured to engage with a back side of the wall.

15. The console assembly of claim 14, wherein the distance between opposite sides of the two extensions at the second end of the clip is less than the distance of an opening of the aperture along a front side of the wall.

16. The console assembly of claim 13, wherein the connecting portion is less thick than the leg and the locking portion.

17. The console assembly of claim 13, wherein the locking portion only extends along a portion of the entire width of the extension.

18. The console assembly of claim 13, wherein at least a portion of the leg is positioned next to the locking portion along the entire width of the extension.

19. The console assembly of claim 13, wherein the leg includes a tip extending beyond the locking portion along the length of the clip, wherein the distance between opposite sides of the tips of each of the extensions of the clip is less than the distance between opposite sides of the legs of each of the extensions of the clip.

20. The console assembly of claim 13, wherein the clip is configured to removably secure a cup holder within the console.

* * * * *